United States Patent [19]
Koibuchi

[11] Patent Number: 5,882,092
[45] Date of Patent: Mar. 16, 1999

[54] BEHAVIOR CONTROL DEVICE OF VEHICLE AGAINST DRIFT-OUT WITH WATCHING OF REAR WHEEL SLIDE

[75] Inventor: Ken Koibuchi, Susono, Japan

[73] Assignee: Toyota Jidosha Kabushiki Kaisha, Toyota, Japan

[21] Appl. No.: 798,465

[22] Filed: Feb. 10, 1997

[30] Foreign Application Priority Data

Feb. 23, 1996 [JP] Japan .................................. 8-061911

[51] Int. Cl.⁶ .............................. B60T 8/32; B60T 8/64
[52] U.S. Cl. ..................... 303/146; 180/197; 303/140; 303/147
[58] Field of Search ................... 303/146, 147, 303/139, 140, 141, 163, 165; 180/197; 701/72, 82, 84, 83, 188; 188/181 A, 181 C

[56] References Cited

U.S. PATENT DOCUMENTS

| | | | |
|---|---|---|---|
| 5,267,783 | 12/1993 | Inoue et al. | 303/146 |
| 5,702,165 | 12/1997 | Koibuchi | 303/146 |
| 5,704,695 | 1/1998 | Monzaki et al. | 303/146 |
| 5,704,696 | 1/1998 | Monzaki | 303/149 |
| 5,707,119 | 1/1998 | Monzaki | 303/146 |
| 5,707,120 | 1/1998 | Monzaki et al. | 303/146 |
| 5,709,439 | 1/1998 | Monzaki | 303/146 |
| 5,727,853 | 3/1998 | Monzaki | 303/146 |
| 5,738,420 | 4/1998 | Kawaguchi et al. | 303/146 |

FOREIGN PATENT DOCUMENTS

| | | |
|---|---|---|
| 3-186464 | 8/1991 | Japan . |
| 3-239673 | 10/1991 | Japan . |
| 3-276855 | 12/1991 | Japan . |
| 5-254406 | 10/1993 | Japan . |

*Primary Examiner*—Douglas C. Butler
*Attorney, Agent, or Firm*—Oliff & Berridge, PLC

[57] ABSTRACT

A behavior control device of a vehicle having a device for estimating a drift-out value representative of drifting out state of the vehicle; a device for estimating slip angle of rear wheels; and a controller for controlling a brake system such that, when the drift-out value is greater than a threshold value determined therefor, a moment for yawing the vehicle body in a direction of suppressing the drifting out of the vehicle represented by the drift-out value is generated in accordance with the slip angle of the rear wheels, the yaw moment increases as the slip angle of the rear wheels increases, with a restriction that the yaw moment is no longer increased when the slip angle reaches a limit value representing a state that the cornering force of the rear wheels is substantially at a maximum.

6 Claims, 6 Drawing Sheets

BEHAVIOR CONTROL DEVICE OF VEHICLE AGAINST DRIFT-OUT WITH WATCHING OF REAR WHEEL SLIDE

BACKGROUND OF THE INVENTION

1. Field of the Invention

The present invention relates to a behavior control device of a vehicle such as an automobile, and more particularly, to a behavior control device of a vehicle for suppressing the vehicle from drifting out with a precaution against the vehicle causing spinning as a result of a drift-out suppress control.

2. Description of the Prior Art

It is known to suppress a vehicle such as an automobile from drifting out as it occurs when the vehicle is driven along a curved road at a relatively high speed by applying a braking to a wheel or wheels at the inside of the turn so that a yaw moment is generated in the vehicle body to help the turn of the vehicle, as described in, for example, Japanese Patent Laid-open Publication 5-254406. Such a braking method is generally more effective when the rear wheel at the inside of the turn is braked, as the yaw moment for turning the vehicle in the turning direction is more effectively generated around the rear wheel serving as a pivot axis of the yaw moment.

However, the drift-out control induces, as a matter of course, a spinning of the vehicle, if it goes too far. Particularly when the rear wheel at the inside of the turn is braked, the tire grip limit of the braked rear wheel reached by the vector addition of the longitudinal slip due to the braking and the lateral slip due to the centrifugal force reduces the capacity of the lateral grip of the braked rear wheel, thereby causing a side slide of the rear of the vehicle, i.e. the spinning of the vehicle.

SUMMARY OF THE INVENTION

It is therefore a primary object of the present invention to provide a behavior control device of a vehicle which can suppress the drifting out of the vehicle by braking without causing the spinning thereof.

A further object of the present invention is to provide such a behavior control device of a vehicle so as to have a higher performance in more effectively suppressing the drifting out, while more effectively avoiding the spinning, according to a special manner of control of the braking.

A still further object of the present invention is to provide such a behavior control device of a vehicle so as to have a still higher performance by incorporation of an engine traction control as combined with the brake control.

According to the present invention, the above-mentioned primary object is accomplished by a behavior control device of a vehicle having a vehicle body, front left, front right, rear left and rear wheels, an engine and a brake system, comprising:

a means for estimating a drift-out value representative of drifting out state of the vehicle;

a means for estimating slip angle of the rear wheels; and a means for controlling said brake system such that, when said drift-out value is greater than a drift-out threshold value determined therefor for braking, a moment for yawing the vehicle body in a direction of suppressing the drifting out of the vehicle represented by said drift-out value is generated in accordance with the slip angle of the rear wheels, said yaw moment increases as said slip angle of the rear wheels increases, with a restriction that said yaw moment is no longer increased when the slip angle of the rear wheels reaches a limit value representing a state that the cornering force of the rear wheels is substantially at a maximum.

Further, according to the present invention, said further object is accomplished by a provision that said control means controls said brake system such that, when said drift-out value increases to be greater than said drift-out threshold value for braking, only one of the rear wheels at the inside of a turn of the vehicle is braked for a predetermined time duration.

Further, according to the present invention, said still further object is accomplished by a provision that the vehicle is a front drive vehicle, and the vehicle behavior control device further comprises a means for controlling engine output torque such that, when said drift-out value is greater than a drift-out threshold value determined therefor for lowering engine output torque, output torque of the engine is lowered. Further, said engine control means may delay said lowering of engine output torque for a predetermined period after said drift-out value crosses said drift-out threshold value for lowering engine output torque.

The behavior control device may further comprise a means for estimating a spin value representative of spinning state of the vehicle, and said engine control means may control engine output torque further such that, when said spin value is greater than a spin threshold value determined therefor for increasing engine output torque, output torque of the engine is increased.

By said brake system control means controlling said brake system such that, when said drift-out value is greater than a threshold value determined therefor, a moment for yawing the vehicle body in a direction of suppressing the drifting out of the vehicle represented by said drift-out value is generated in accordance with the slip angle of the rear wheels so that said yaw moment is made greater as said slip angle of the rear wheels is greater, with, however, a restriction that said yaw moment is no longer increased when said slip angle of the rear wheels reaches a limit value determined therefor to represent a state that the cornering force of the rear wheels is substantially maximum, it is effectively avoided that the braking for the purpose of generating the yaw moment in the vehicle body for suppressing the drifting out of the vehicle is proceeded so far that the cornering force of the rear wheels decreases beyond its maximum value along with further increase of the braking such as to cause the spinning of the vehicle.

In order to generate a yaw moment in the vehicle body by a braking of the vehicle, although it is most effective to brake the vehicle by the rear wheel at the inside of the turn, since the vertical load on the wheels at the inside of the turn is reduced by the swinging of the vehicle body to the outside of the turn, when the braking is concentrated to the rear wheel at the inside of the turn, the lateral grip capacity of the braked wheel is much reduced by the application of the braking according to the vector addition of the longitudinal slip caused by the braking and the lateral slip caused by the centrifugal force generated in the vehicle body by a turn driving of the vehicle, because, since the friction circle having a radius corresponding to the vector addition of those longitudinal and lateral friction forces is limited, if the longitudinal slip increases due to the braking, the lateral slip allowed within the friction circle decreases. Therefore, although the braking of the wheel at the inside of the turn is very effective for generating a yaw moment for suppressing the drifting out of the vehicle, it is not expedient to continue such a braking beyond a limited time duration at an early stage of the braking. In view of these, for more improving the performance of the behavior control device of the present invention, the device is so constructed that, when said drift-out value crosses said drift-out threshold value toward increase, only one of the rear wheels at the inside of the turn of the vehicle is braked for a predetermined time duration. Thereafter, if the slip angle of the rear wheels does not yet reach the limit value determined therefor to represent the state that the cornering force of the rear wheels is substantially maximum, the braking may be continued such that the braking force is now distributed among a plurality of wheels. By such a braking of a plurality of wheels, it is still possible to generate a yaw moment in the vehicle body by braking the wheel or wheels at the inside of the turn more strongly than the wheel or wheels at the outside of the turn. Further, the braking of the vehicle contributes to suppressing the drifting out of the vehicle by a deceleration thereof.

When the vehicle is a front drive vehicle, it is also effective for suppressing the drifting out of the vehicle to lower output torque of the engine, as being more effective than merely available by a reduction of vehicle speed, because the longitudinal slip ratio of the front wheels is reduced, thereby increasing the lateral grip capacity of the front wheels. Therefore, by incorporating such an engine traction control to operate in addition to the braking control when said drift-out value crosses a threshold value toward increase, the performance of the behavior control device for suppressing the drifting out of the vehicle without causing the spinning thereof will be further improved.

Although the behavior control device according to the present invention controls the braking of the vehicle for the purpose of suppressing the drifting out of the vehicle by watching the side sliding condition of the rear wheels such that the cornering force of the rear wheels does not substantially reach its maximum, it will be more desirable that the spinning state of the vehicle is watched for better precaution against it. Therefore, according to a further modification, the behavior control device of the present invention incorporates a means for estimating a spin value representative of spinning state of the vehicle so that the behavior control device applies a braking to a front wheel at the outside of the turn. Further, particularly when the vehicle is a front drive vehicle equipped with the means for controlling the engine, when said spin value is greater than a threshold value determined therefor, the engine is controlled to increase its output torque, thereby increasing traction by the front drive wheels, to be effective for suppressing the spinning of the vehicle. Particularly when such an engine output torque control is carried out in combination with the braking control for the suppress of the drifting out of the vehicle, if the engine output torque is increased together with a braking of the front wheel at the outside of the turn, the vehicle is very effectively suppressed against the spinning, because a yaw moment is generated by the inertia of the vehicle body to turn around the braked front wheel at the outside of the turn in the direction opposite to the direction of the spinning, while the vehicle body is also driven by the front wheel at the inside of the turn with an increased torque more effectively transmitted to the front wheel at the inside of the turn through a differential gear against the braked front wheel at the outside of the turn. Therefore, by such an arrangement that the behavior control device estimates a spin value representative of the spinning state of the vehicle and controls the engine such that, when the spin value is greater than a threshold value determined therefor, the output torque of the engine for driving the front wheels is increased, the drifting out of the vehicle is more effectively suppressed by more definitely precluding occurrence of the spinning as induced by the drift-out suppress control.

BRIEF DESCRIPTION OF THE DRAWING

In the accompanying drawing.

DESCRIPTION OF THE EMBODIMENT

In the following, the present invention will be described in more detail with respect to an embodiment thereof with reference to the accompanying drawings.

Figure 1:
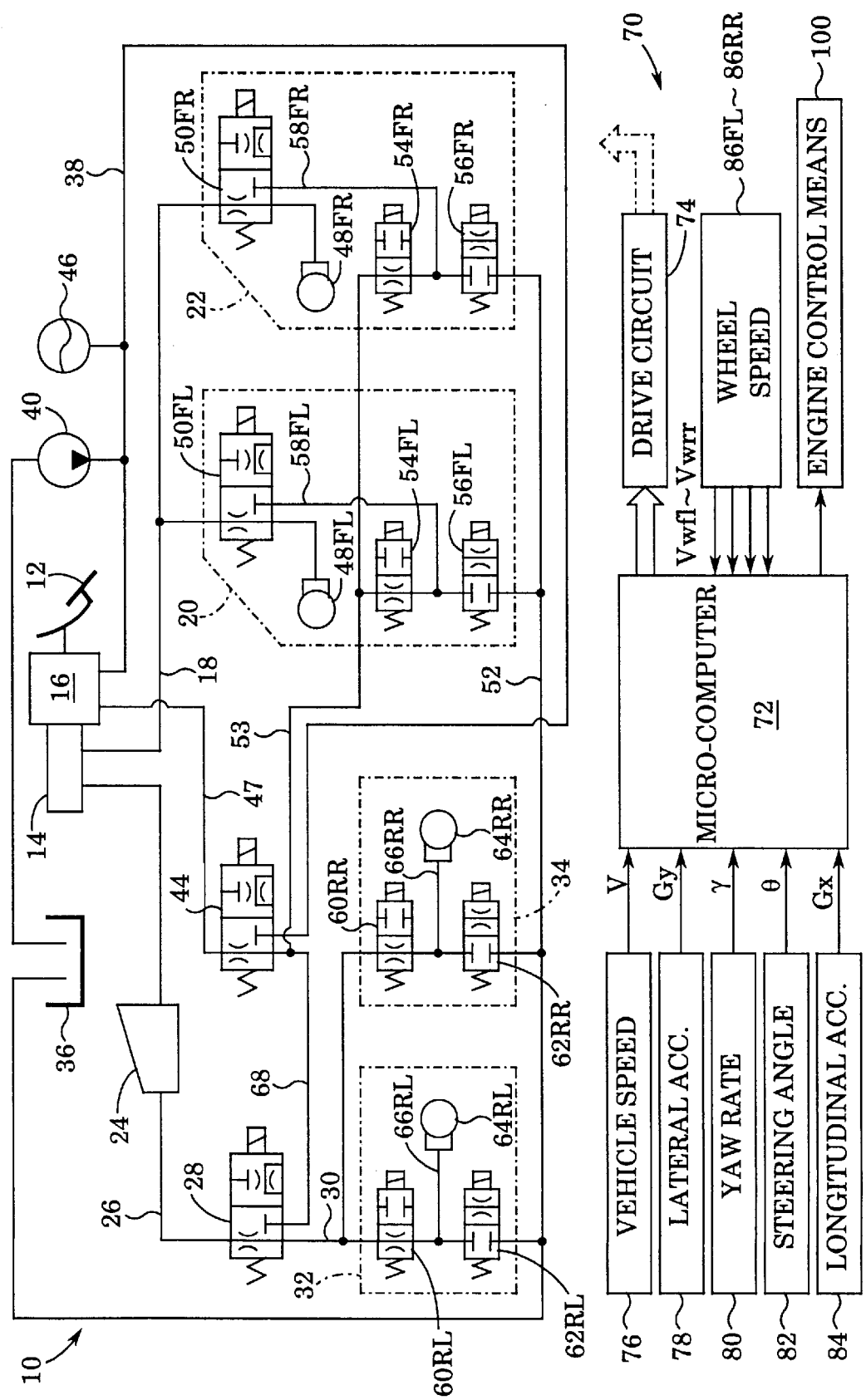
FIG. 1 is a diagrammatical illustration of the hydraulic circuit means and the electrical control means to which the behavior control device according to the present invention is applied.

First, referring to FIG. 1 showing diagrammatically an embodiment of the behavior control device of the present invention with regard to the constructions of its hydraulic circuit means and its electric control means, the hydraulic circuit means generally designated by 10 comprises a conventional manual brake pressure source means including a brake pedal 12 to be depressed by a driver, a master cylinder 14 adapted to generate a master cylinder pressure according to the depression of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the depression performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first manual brake pressure passage 18 extends from a first port of the master cylinder 14 to a front left wheel brake pressure control means 20 and a front right wheel brake pressure control means 22. A second manual brake pressure passage 26, including in its way a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the common passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the first manual brake pressure passage 18, while disconnecting them from the connection passages 58FL and 58FR, respectively, as in the state shown in the figure, and a second position for disconnecting the wheel cylinders 48FL and 48FR from the first manual brake pressure passage 18, while connecting them with the connection passages 58FL and 58FR, respectively.

The control valve 28 is switched over between a first position for connecting the common passage 30 for both of the series connection of the on-off valves 60RL and 62RL and the series connection of the on-off valves 60RR and 62RR with the second manual brake pressure passage 26 as in the state shown in the figure, and a second position for disconnecting the common passage 30 from the second manual brake pressure passage 26, while connecting it with a passage 68 connected to one outlet port of the changeover control valve 44 together with the passage 53, so as to be connected with either a delivery port of the hydro-booster 16 through the passage 47 or the accumulator pressure passage 38, according to whether the control valve 44 is in a first position, such as shown in the figure, and or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels not shown in the figure from wheel speed sensors 86FL-86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 5:
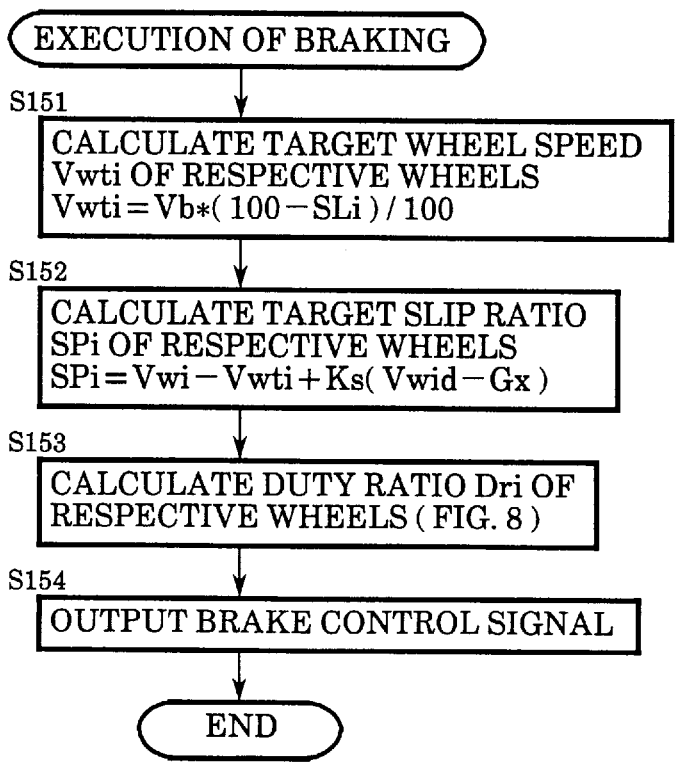
FIG. 5 is a flowchart showing a subroutine conducted at step 160 of the flowchart of FIG. 3.
Figure 6:
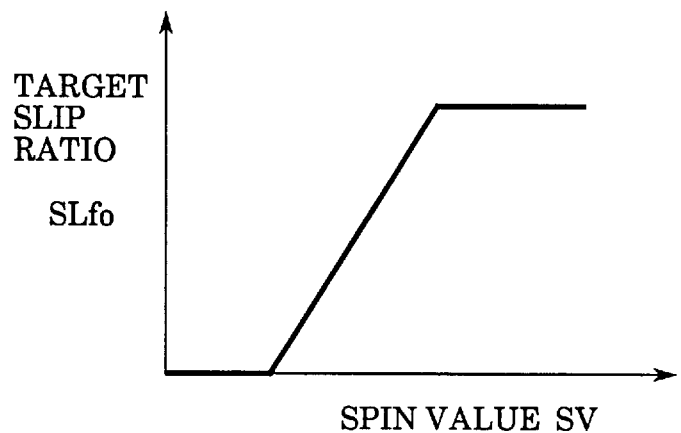
FIG. 6 is a map showing the relationship between the target slip rate and the spin value.
Figure 7:
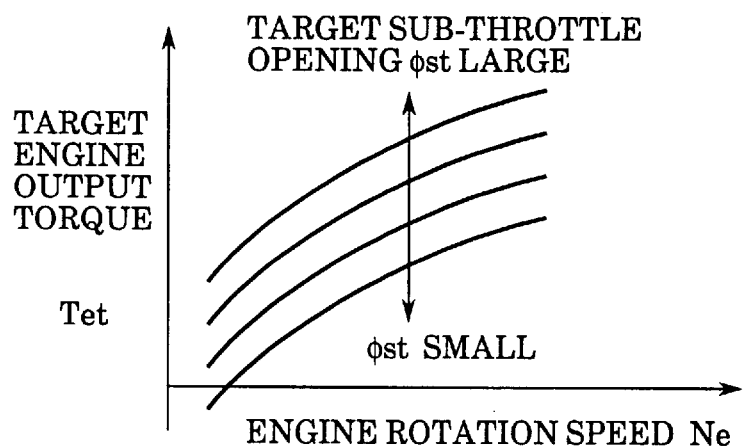
FIG. 7 is a map showing the relationship among the target engine output torque, engine rotation speed and the sub-throttle target opening.
Figure 8:
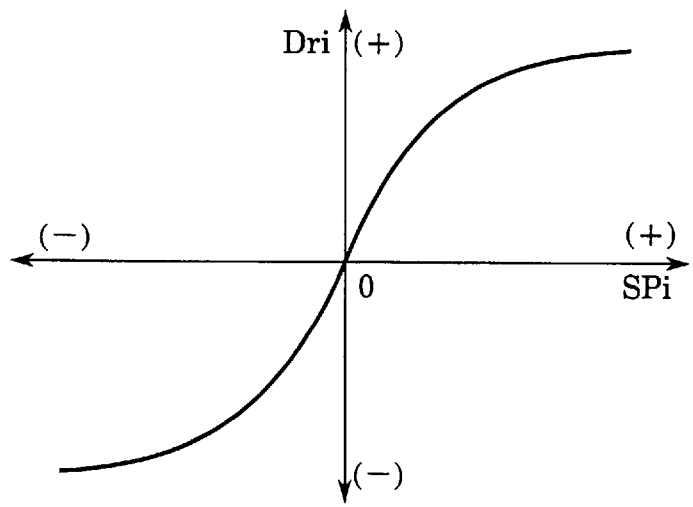
FIG. 8 is a map showing the relationship between the duty ratio and the slip rate.
Figure 9:
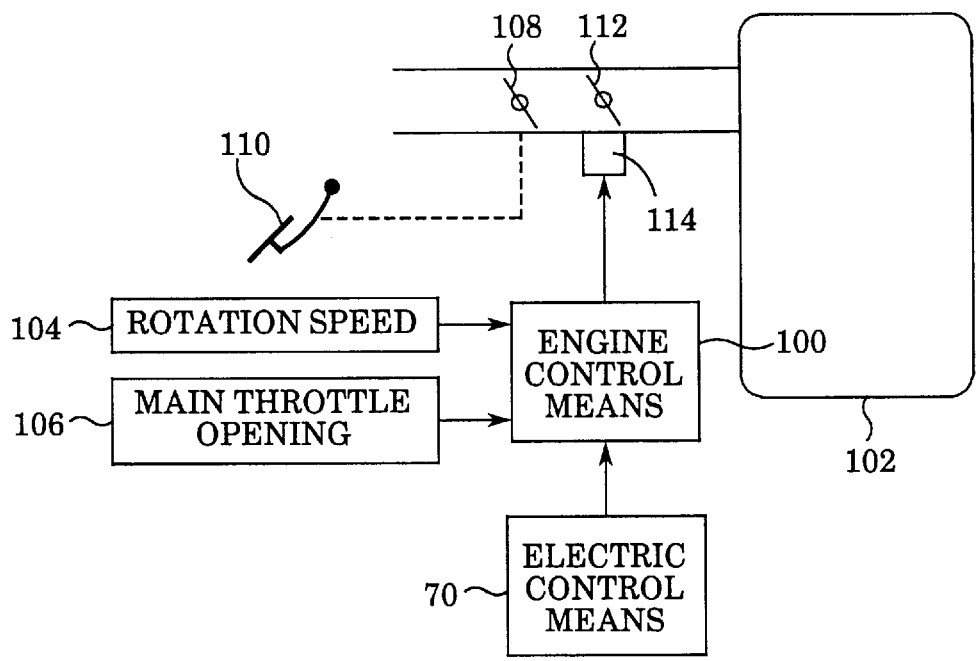
FIG. 9 is a diagrammatic illustration of an embodiment of the engine traction control means.

The read only memory of the micro-computer 72 stores such flowcharts as shown in FIGS. 2, 3, 4 and 5 and such maps as shown in FIGS. 6, 7 and 8. The central processing unit conducts various calculations based upon the parameters detected by the above-mentioned various sensors according to those flowcharts and maps as described hereinbelow, so as to estimate the drift-out value and the spin value representative of drifting out state and spinning state of the vehicle, respectively, and controls the turn behavior of the vehicle based upon the estimated quantities, to suppress the vehicle from drifting out and spinning, by selectively applying a variable braking force to each of the wheels.

Figure 2:
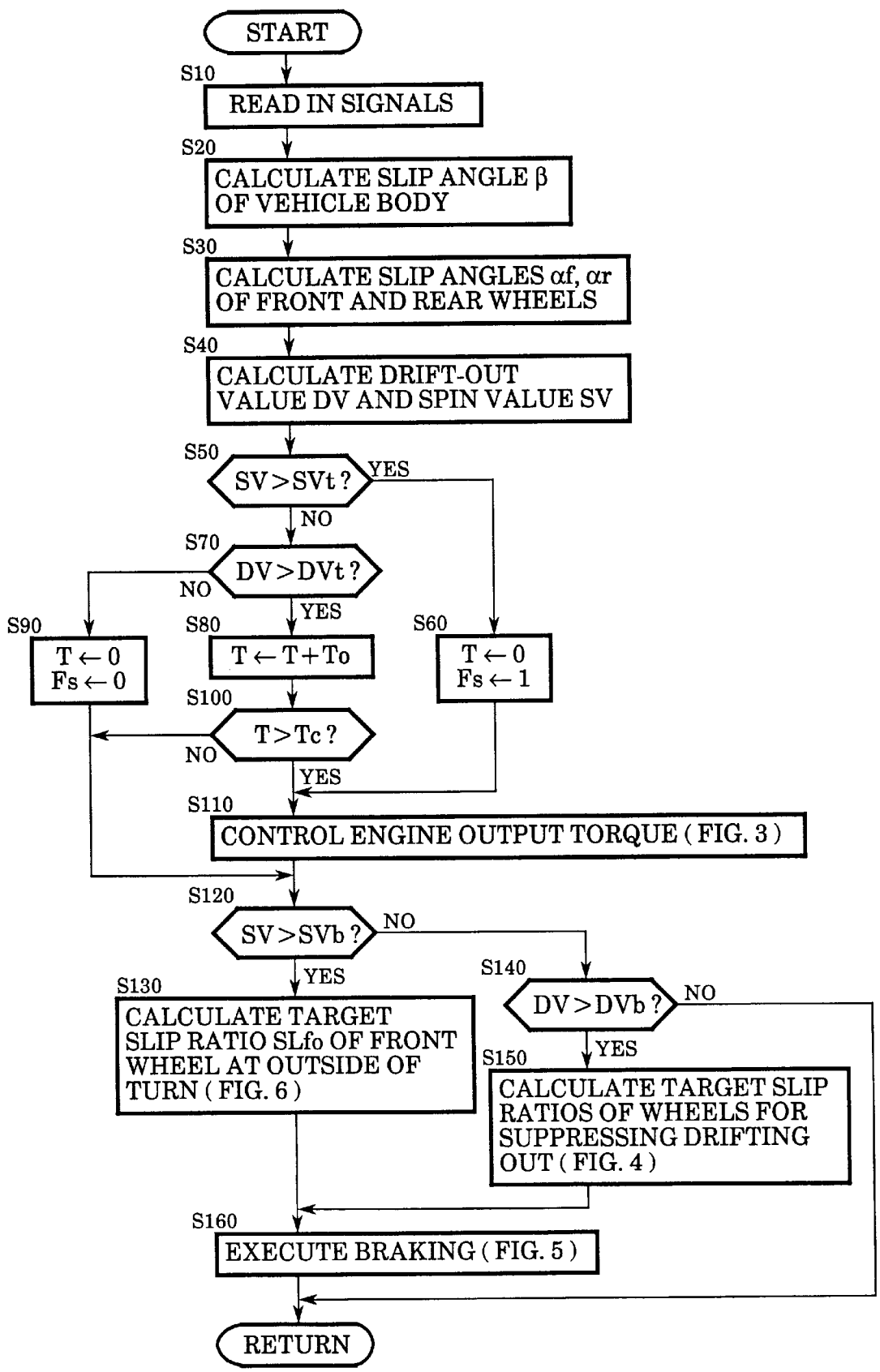
FIG. 2 is a flowchart showing an embodiment of the behavior control carried out by the behavior control device of the present invention.

In the following, the behavior control device of the present invention will be described in the form of an embodiment of its control operation with reference to FIGS. 2–10. The control according to the flowchart of FIG. 2 showing the overall control process of the device is started by a closure of an ignition switch, not shown in the figure, and carried out repetitively at a predetermined time interval such as tens of microseconds.

In step 10, the signals are read in from the sensors shown in FIG. 1.

In step 20, the slip angle of the vehicle body is calculated by first calculating a difference between the lateral acceleration Gy detected by the sensor 78 and the lateral acceleration calculated as a product of vehicle speed V and yaw rate $\gamma$, such as Gy–V*$\gamma$, which is lateral slide acceleration, then integrating this difference on time basis to obtain lateral slide velocity Vy, and then calculating the ratio of Vy to vehicle speed V so as to obtain the slip angle $\beta$ of the vehicle body, such as $\beta$=Vy/V.

In step 30, slip angles $\alpha f$ and $\alpha r$ of the front and rear wheels are calculated according to the following equations, wherein Lf and Lr are longitudinal distances of the front and rear axles from the center of gravity of the vehicle body, respectively, and $\delta f$ is the steering angle of the front wheels (mean of left and right):

$$\alpha f = \beta + Lf^*\gamma/V - \delta f$$

$$\alpha r = \beta - Lr^*\gamma/V$$

In step 40, the above-mentioned drift-out value and spin value, denoted as DV and SV, respectively, are calculated as follows:

Conveniently, the drift-out value may be estimated to be equivalent to the absolute value of $\alpha r$, so that, when the vehicle is making a left turn, DV=$\alpha r$, while when the vehicle is making a right turn, DV=–$\alpha r$. Or, more delicately, the drift-out value may be estimated by first calculating a target yaw rate $\gamma c$, with the wheel base L and an appropriate factor Kh, then estimating an actual yaw rate $\gamma t$ by incorporation of the well know time delay, and then calculating the rate of the difference between $\gamma t$ and $\gamma$ against vehicle speed V, as follows:

$$\gamma c = V^*\delta f/(1+Kh^*V^2)^*L$$

$$\gamma t = \gamma c/(1+T^*s)$$

$$DV = (\gamma t - \gamma)/V$$

The spin value SV is estimated as a value corresponding to a linear sum of the slip angle $\beta$ of the vehicle body and the differential of $\beta$, by taking appropriate factors Ka and Ks, such as SV=Ka*$\beta$+Kb*d $\beta$/dt when the vehicle is making a left turn, while SV=–(Ka*$\beta$+Kb*d $\beta$/dt) when the vehicle is making a right turn, with a modification that if SV becomes negative according to the above definition, SV is made 0.

In step 50, it is checked if SV is greater than SVt, a threshold value determined therefor for executing the above-mentioned engine control of increasing the output torque of the engine effective for suppressing the spinning of the vehicle. If the answer is yes, the control proceeds to step 60, while if the answer is no, the control proceeds to step 70. In step 60, time count T is reset to zero and flag Fs is set to 1, and the engine control is executed in step 110, which will be described in more detail hereinbelow with reference to FIG. 3. However, before describing step 110, steps 70–100 will be described.

In step 70, it is checked if DV is greater than DVt, a threshold value determined therefor for executing the above-mentioned engine control of decreasing the output torque of the engine effective for suppressing the drifting out of the vehicle. If the answer is yes, the control proceeds to step 80, while if the answer is no, the control proceeds to step 90. When the control proceeds to step 80 toward step 110, an allowance time is taken before the engine torque reduction control is actually executed, considering that, since the drift-out suppress control is generally not so urgently needed as the spin suppress control, a period is allowed, without substantially affecting the quality of the control, to confirm that the positive judgment of step 70 is not due to only a momentary fluctuation of the data concerned. So in step 80, time count T of a timer is incremented by a unit time To, and in step 100 it is checked if the positive judgment of step 70 was consecutively made for a predetermined time duration Tc. Then, if the answer is yes in step 100, the control proceeds to step 110, while until then, the control bypasses step 110.

When the answer of step 70 is no, in step 90, the time count T is reset to 0, flag Fs is reset to 0, and then the control bypasses step 110.

After step 110, or as it was bypassed, in step 120, it is checked if SV is greater than SVb, a threshold value determined therefor for braking the front wheel at the outside of the turn to generate an anti-spin yaw moment in the vehicle body by the inertia thereof. If the answer is yes, the control proceeds to step 130, while if the answer is no, the control proceeds to step 140. In step 130, a target slip ratio for braking the front wheel at the outside of the turn is estimated according to the magnitude of the spin value SV by referring to a map prepared beforehand as shown in FIG. 6.

In step 140, it is checked if DV is greater than DVb, a threshold value determined therefor for braking the wheels to suppress the drifting out of the vehicle according to the manner outlined in the above. If the answer is yes, the control proceeds to step 150, while if the answer is no, the control bypasses step 150. The brake control executed in step 150 is described in more detail hereinbelow with reference to FIG. 4.

After step 130 or step 150, in step 160, the braking is executed as described hereinbelow with reference to FIG. 5, by actuating the hydraulic circuit showing in FIG. 1.

Figure 3:
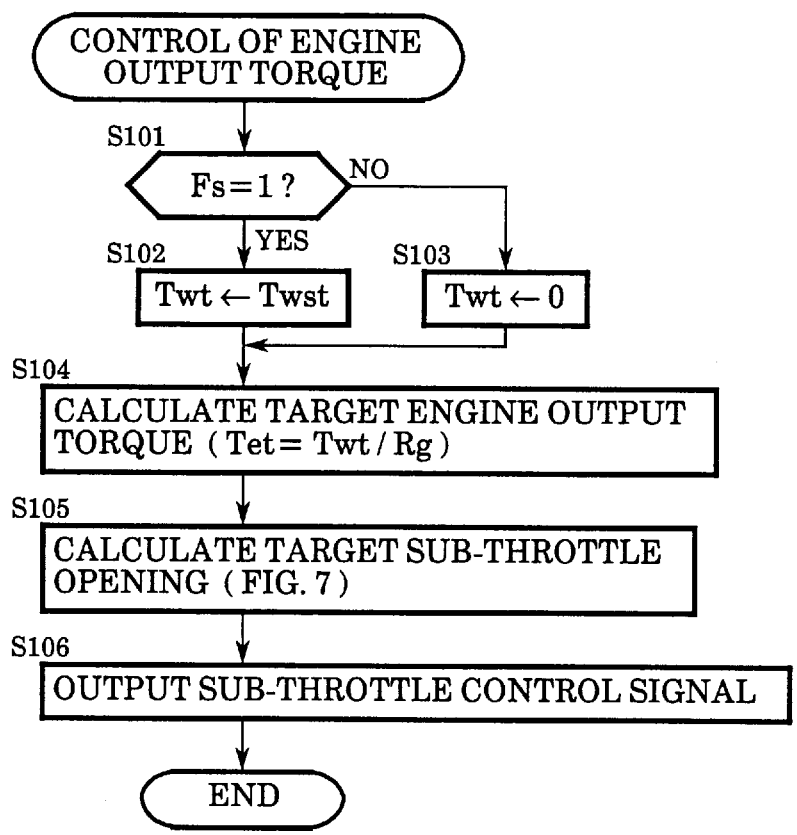
FIG. 3 is a flowchart showing a subroutine conducted at step 110 of the flowchart of FIG. 3.

FIG. 3 shows how the engine output torque is controlled in step 110 of FIG. 2. In the flowchart showing the engine output torque control process, in step 101 it is checked if flag Fs is set to 1 or not (i.e. 0, as normally so initialized at the start of the control of FIG. 2 or in step 90 when it is passed). If Fs is 1, i.e. if the spin value SV is greater than SVt, indicating that the vehicle is spinning at more than a certain determined level, the control proceeds to step 102, and it is determined to increase the traction force exerted by the front driving wheels as much as Twst by controlling a sub-throttle shown in FIG. 9. As will be obvious from the diagrammatic showing of FIG. 9, the power output of the engine 102 of the vehicle is controlled by a main throttle valve 108 operated by an accelerator pedal 110 adapted to be depressed by the driver and a sub-throttle valve 112 operated by an actuator 114 under the control of the engine control means 100 based upon the control signal generated by the electric control means 70, as already shown in FIG. 1. In such a double throttling engine power control system, the sub-throttle valve 112 is generally so adapted that it can increase the engine output power within a certain amount when the engine is being operated with the main throttle valve 108 being opened within a normal medium range, while it can decrease the engine output power to zero (in fact, even to be negative when the engine braking is effected) regardless of the opening of the main throttle valve.

In step 104, the target increase of the traction force Twt inputted with Twst of the front wheels is converted into a corresponding increase of engine output torque Tet by reference to transmission gear ratio Rg at the moment.

On the other hand, if Fs is not 1, then in step 103 the parameter Twt is set to zero, as an embodiment, so that the engine output is made zero, i.e. the sub-throttle valve 112 is fully closed.

In step 105, a target opening ø st of the sub-throttle valve 112 to provide the target increase or decrease of the engine output torque is calculated by referring to a map such as shown in FIG. 7, with information with regard to engine rotation speed Ne detected by an engine rotation speed sensor 104 and main throttle opening detected by a main throttle opening sensor 106. Then in step 106, a sub-throttle control signal is dispatched from the engine control means 100 toward the actuator 114 so that the sub-throttle valve 112 is set to a corresponding opening.

Figure 4:
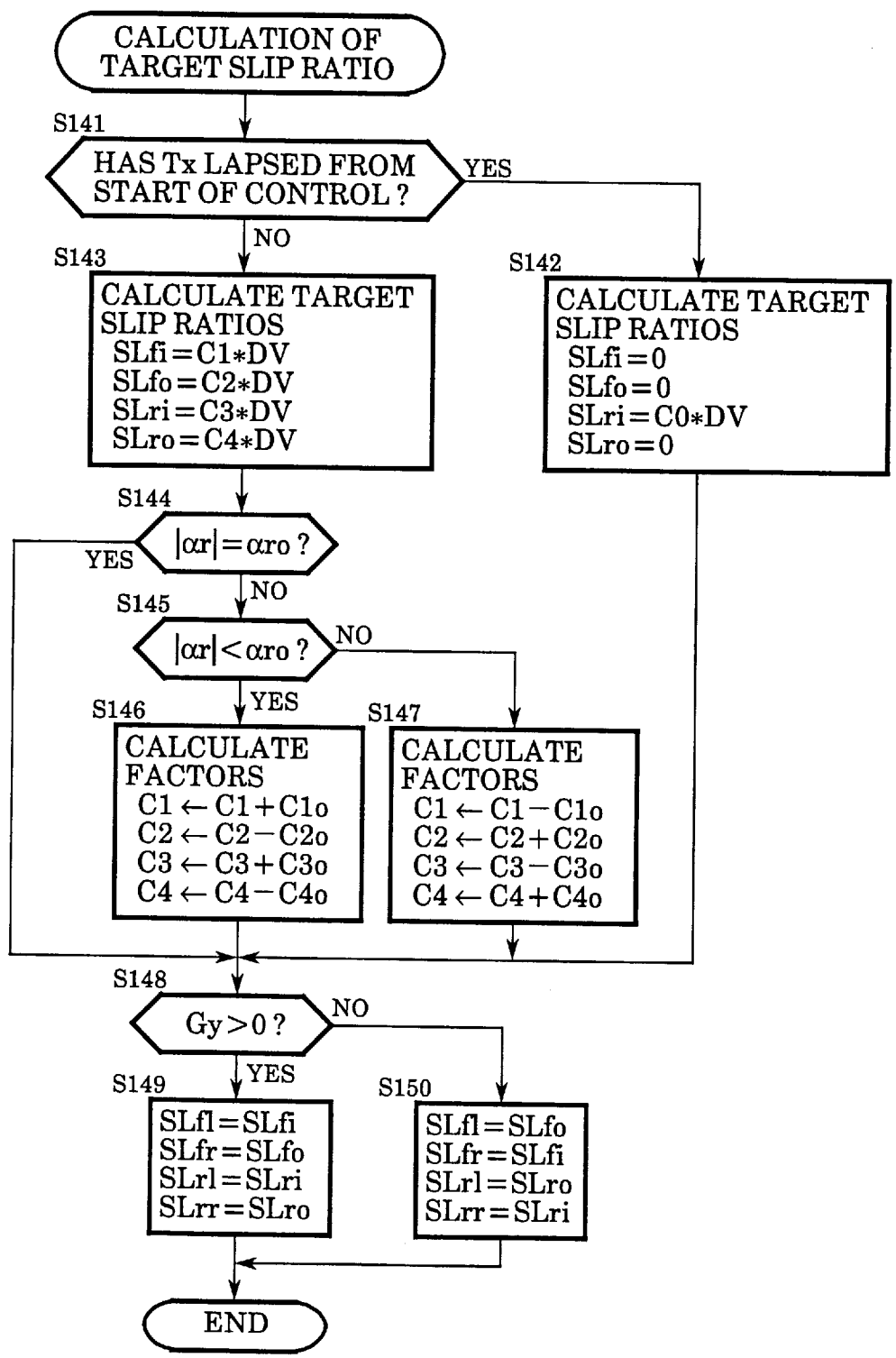
FIG. 4 is a flowchart showing a subroutine conducted at step 150 of the flowchart of FIG. 3.

The execution of braking made in step 150 of FIG. 2 is shown in FIG. 4 in the form of a flowchart. According to this embodiment, first in step 141, it is checked if a predetermined time duration Tx has lapsed from the start of this control, i.e. the braking for suppressing the drifting out of the vehicle. As will be noted hereinbelow, this time duration is a period during which the braking for suppressing the drifting out is applied only to the rear wheel at the inside of the turn, so as to be most effective for that purpose as long as the tire grip of that wheel does not saturate, and may be of such a time duration as one second. If the answer is no, the control proceeds to step 142, and in step 142, a target slip ratio SLxy (xy=fi, fo, ri, ro) for the respective wheels are calculated such that only SLri for the rear wheel at the inside of the turn is a certain positive value proportional to the drift-out value DV with a proportioning factor C0, while SLfi, SLfo and SLro for the front wheels and the rear wheel at the outside of the turn are all zero.

After the lapse of the time duration Tx, the control proceeds to step 143, and all of SLfi–SLro are calculated to have certain positive values proportional to DV with respective proportioning factors C1–C4. It will be more desirable that C1–C4 are determined such that C1 and C3 for the wheels at the inside of the turn are larger than C2 and C4 for the wheels at the outside of the turn for more effectively suppressing the drifting out by the inertia of the vehicle body, other than the effect of suppressing the drifting out by a reduction of the centrifugal force applied to the vehicle body due to a reduction of vehicle speed. However, since the tire grip capacity is lower in the wheels at the inside of the turn as compared with those at the outside of the turn due to a shifting of the vertical load distribution to the outside of the turn, the balance among C1–C4 will need a consideration of vehicle speed. In any event, the determination of factors such as C0 and C1–C4 will need theory and experiments.

Figure 10:
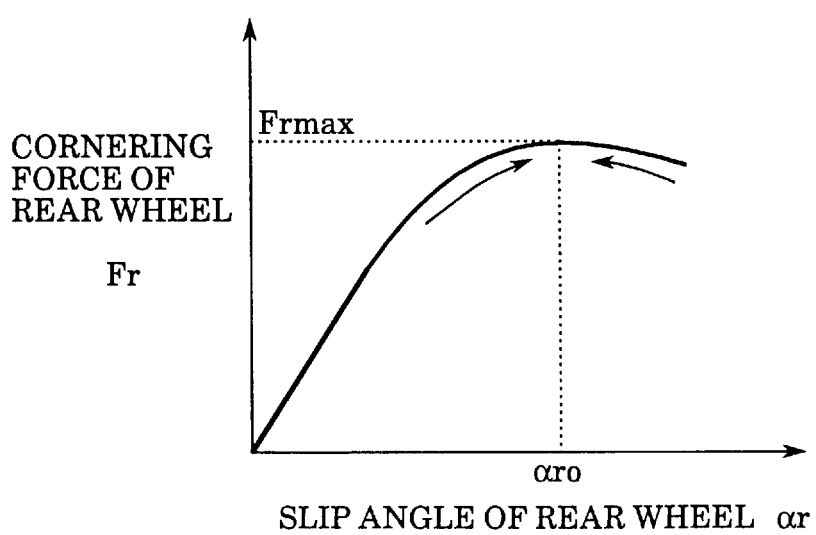
FIG. 10 is a graph showing the relationship between the cornering force and the slip angle of the rear wheel.

In step 144, it is checked if the absolute value of the slip angle αr of the rear wheels is equal to a threshold value αro determined therefor for checking if the cornering force of the rear wheels is approaching its maximum, as shown in FIG. 10. When the answer is no, the control proceeds to step 145, and it is further checked if the absolute value of αr is larger or smaller than αro, and according to yes or no of the answer, the control proceeds to step 146 or 147, respectively. In step 146, factors C1 and C3 for the wheels at the inside of the turn are increased by respective increments C1o and C3o determined therefor, while factors C2 and C4 for the wheels at the outside of the turn are decreased by respective increments C2o and C4o, as there still remains in the tire grip capacity of the wheels at the inside of the turn a room for further increasing the slip ratio thereof by further braking. To the contrary, when the absolute value of αr has exceeded αro corresponding to the maximum of the cornering force available at the rear wheels, in step 147, factors C1 and C3 are decreased by C1o and C3o, while factors C2 and C4 are increased by C2o and C4o.

In step 148, the direction of the turn of the vehicle is detected by the sign of the lateral acceleration Gy of the vehicle, and then either in step 149 or 150, the values of SLfi, SLfo, SLri and SLro are allocated for the slip ratios SLi (i=fl, fr, rl, rr) of the corresponding front left, front right, rear left and rear right wheels.

The execution of braking carried out in step 160 of FIG. 2 is shown in FIG. 5 in the form of a flowchart. In step 151, based upon the slip ratios SLi, and a standard wheel speed Vb detected with respect to the rear wheel at the outside of the turn for convenience, target wheel speed Vwti (i=fl, fr, rl, rr) of the respective wheels are calculated as follows:

$$Vwti = Vb * (100 - SLi)/100$$

Then, in step 152, target slip rate SPi (i=fl, fr, rl, rr) of the respective wheels are calculated as a difference between wheel speed Vwi (i=fl, fr, rl, rr) detected with respect to each wheel and the corresponding target value therefor, by taking the changing rate of Vwti into consideration (Ks is an appropriated factor), as follows:

$$SPi = Vwi - Vwti + Ks*(dVwi/dt - Gx)$$

Then in step 153, duty ratio Dri (i=fl, fr, rl, rr) of the time duration of charging the pressurized fluid to each of the wheels cylinders 48FL–48RR to the time duration of discharging the fluid from the wheel cylinder are calculated according to SPi by referring to a map such as shown in FIG. 8. In this connection, although the curve of the relationship between Dri and SPi is shown to traverse the zero center of the coordinate with an inclination, it will be necessary to provide a non-responsive region around the zero center to avoid a hunting of the on-off valves 54FL, etc., as well known in the art.

Although the present invention has been described in the above with respect to a particular embodiment thereof, it will be apparent for those skilled in the art that various modifications are possible without departing from the spirit of the present invention.

I claim:

1. A behavior control device of a vehicle having a vehicle body, front left, front right, rear left and rear right wheels, an engine and a brake system comprising:

means for estimating a drift-out value representative of drifting out state of the vehicle;

means for estimating slip angle of the rear wheels; and means for controlling said brake system such that, when said drift-out value is greater than a drift-out threshold value determined therefor for braking, a moment for yawing the vehicle body in a direction of suppressing the drifting out of the vehicle represented by said drift-out value is generated in accordance with the slip angle of the rear wheels, said yaw moment increases as said slip angle of the rear wheels increases, with a restriction that said yaw moment is no longer increased when said slip angle reaches a limit value representing a state that the cornering force of the rear wheels is substantially at a maximum.

2. A behavior control device according to claim 1, wherein said control means controls said brake system such that, when said drift-out value increases to be greater than said drift-out threshold value for braking, only one of the rear wheels at the inside of a turn of the vehicle is braked for a predetermined time duration.

3. A behavior control device according to claim 1, wherein the behavior control means further comprises a means for estimating a spin value representative of spinning state of the vehicle, and said control means controls said brake system such that, when said spin value is greater than a spin threshold value determined therefor for braking, a front wheel at the outside of a turn of the vehicle is braked.

4. A behavior control device according to claim 1, wherein the vehicle is a front drive vehicle, and the behavior control device further comprises a means for controlling said engine such that, when said drift-out value is greater than a drift-out threshold value determined therefor for lowering engine output torque, output torque of the engine is lowered.

5. A behavior control device according to claim 4, wherein the behavior control device further comprises a means for estimating a spin value representative of spinning state of the vehicle, and said engine control means controls said engine further such that, when said spin value is greater than a spin threshold value determined therefor for increasing engine output torque, output torque of the engine is increased.

6. A behavior control device according to claim 4, wherein said engine control means delays said lowering of the engine output torque for a predetermined period after said drift-out value crosses said drift-out threshold value for lowering engine output.

* * * * *